United States Patent [19]

Sigg

[11] 4,440,250

[45] Apr. 3, 1984

[54] WEIGHING SCALE HAVING A HYDRAULIC DAMPER INTERCOUPLED BETWEEN THE LOAD RECEIVER AND THE MEASURING CELL

[75] Inventor: Max Sigg, Weisslingen, Switzerland

[73] Assignee: Mettler Instrumente AG, Greifensee, Switzerland

[21] Appl. No.: 346,179

[22] Filed: Feb. 5, 1982

[30] Foreign Application Priority Data

Oct. 16, 1981 [CH] Switzerland .................. 6616/81

[51] Int. Cl.³ .......................................... G01G 21/10
[52] U.S. Cl. ................................ 177/187; 177/189
[58] Field of Search ............................ 177/187, 189

[56] References Cited

U.S. PATENT DOCUMENTS

| 3,982,738 | 9/1976 | Meier et al. | |
|---|---|---|---|
| 4,058,179 | 11/1977 | Price | 177/187 X |
| 4,298,081 | 11/1981 | Blodgett | 177/187 |
| 4,382,479 | 5/1983 | Lee et al. | 177/189 |

FOREIGN PATENT DOCUMENTS 2383437 10/1978 France ............................. 177/189

*Primary Examiner*—George H. Miller, Jr.
*Attorney, Agent, or Firm*—Marianne Rich

[57] ABSTRACT

A scale has a load receiving member and a force receiving member coupled to the load receiving member by flat springs. The force receiving member transmits the force to be measured to a measuring cell. A hydraulic damper is connected in the force transmission path between the load receiver and the force receiver rather than between the force receiver and the frame of the scale as is current practice. The effects of viscous friction in the damper on the accuracy of the scale are thereby eliminated. The container holding the hydraulic fluid of the damper is sealed by a simple packing ring. Overload protection for the measuring cell is provided by a preloaded spring which is connected in series with the damper in the force transmission path.

4 Claims, 1 Drawing Figure

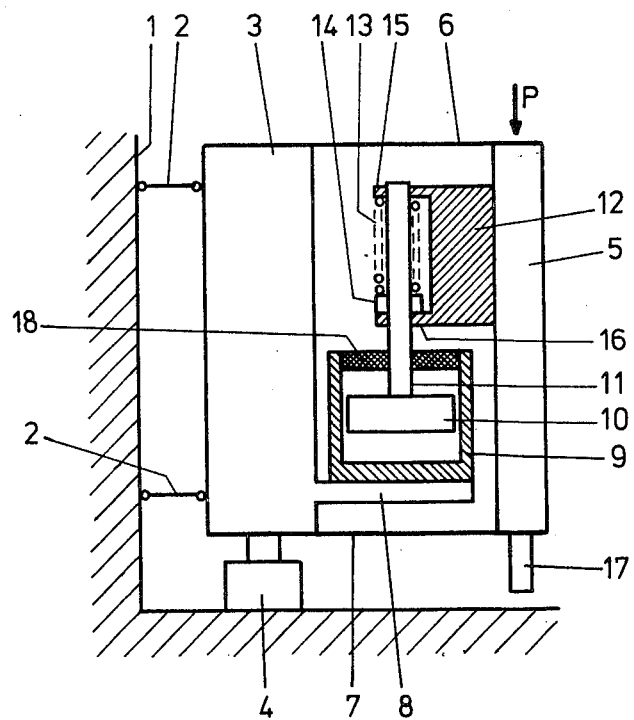

WEIGHING SCALE HAVING A HYDRAULIC DAMPER INTERCOUPLED BETWEEN THE LOAD RECEIVER AND THE MEASURING CELL

CROSS REFERENCE TO RELATED APPLICATIONS AND PUBLICATIONS

1. Swiss Pat. No. 492,961;
2. Swiss Pat. No. 569,262; corresponding to U.S. Pat. No. 3,982,738
3. West German Pat. No. 2244124;
4. U.S. Pat. No. 3,876,017 corresponding to the above-named German patent.

FIELD OF THE INVENTION

The present invention relates to weighing scales and, more particularly, to weighing scales having a damper for preventing oscillations of the load receiving member.

BACKGROUND OF THE INVENTION

In the weighing scales described, for example, in Swiss Pat. No. 492,961 or No. 569,262, or German Pat. No. 2244124 the hydraulic damper is arranged between the load receiving member and the frame of the scale. The damper causes shocks applied to the load receiving member, for example by sudden loading, to be diverted from the measuring cell and applied instead, to the frame.

The disadvantage of this type of arrangement is that the friction effects which occur during operation of the damper affect the accuracy of the scale. Effective sealing of the container is also a problem when the known construction is used.

SUMMARY OF THE INVENTION

It is an object of the present invention to overcome the above mentioned disadvantages.

According to the present invention, the hydraulic damper is interconnected between the load carrier and the force receiving member of the measuring cell. The friction effects in the damper then have no effect whatsoever on the accuracy of the scale. Further, according to the present invention, an overload protection for the measuring cell is provided in the form of a preloaded spring which is arranged in series with a damper in the direction of force transmission.

Since the indication of the scale is independent of any friction effects in the damper, it is not necessary to take any great precautions to eliminate such effects. This allows the construction of the damper to be simplified, in particular in so far as its sealing is concerned.

The force to which the overload spring is preloaded must be chosen so that it exceeds the oscillatory force required to initiate the damping effect; at the same time it must be smaller than the force which would cause the maximum allowable loading of the measuring cell. In practice it has been found that a preloading of the spring to about 5 to 15% of the nominal load of the scale results in optimum operation.

BRIEF DESCRIPTION OF THE DRAWING

The single FIGURE is a schematic diagram illustrating a preferred embodiment of the present invention.

DESCRIPTION OF THE PREFERRED EMBODIMENT

As illustrated in the single FIGURE, the scale according to the present invention has a frame 1. A parallel linkage 2 allows vertical movement of a force receiver 3 which acts directly on a force measuring cell 4. The force measuring cell can be any one of a number of commercially available cells. For example it may be one having oscillating strings. The force P to be measured is applied to a load receiving member 5 which in turn is coupled through flat springs 6 and 7 to force receiving member 3. Force transmission takes place from the load receiving member 5 to the force receiving member 3 through the springs. Further, the springs act as low pass filters for oscillations of load receiving member 5.

Force receiving member 3 has a projection 8. A container 9 which holds hydraulic fluid, and constitutes part of the hydraulic damper rests on projection 8. The hydraulic damper has a piston 10 and a piston rod 11, the latter being constrained to vertical movement by a bearing bracket 12 fastened to load receiving member 5. Overload protection is afforded by a coil spring 13 which bears against a collar 14 of piston rod 11 on the one hand, and against the upper bearing guide 15 of bearing bracket 12 on the other hand, the collar 14 being forced against the lower guide 16 of bearing bracket 12 by the force of coil spring 13.

The static force P to be measured is transmitted from load receiving member 5 to force receiving member 3 and thence to the measuring cell 4 by means of flat springs 6 and 7, while oscillatory forces which, for example, are generated by vibrations in frame 1 are absorbed by hydraulic damper 9, 10 inserted in the force transmission path between load receiving member 5 and force receiving member 3.

Because of its viscous friction, the hydraulic damper does not respond to shock-like loading of load receiving member 5, that is, the force of the shock is transmitted without damping to force receiving member 3. When, however, the force of the shock has a magnitude which exceeds the preloading of coil spring 13, the coil is compressed, thus causing the force applied to force receiving member 3 to be decreased. This protects measuring cell 4. Finally, the movement of load receiving member 15 is limited by a stop 17.

A packing ring 18 completely seals hydraulic damper 9, 10. This completely isolates the damping fluid from the environment and prevents any leaking which could take place while the scale is being transported.

Preferably, packing ring 18 is made of rubber resistant to silicon oil. For a maximum load of 6 kg, spring 13 has, for example, a spring constant of 360 g/mm and is preloaded to 800 grams.

While the invention has been described with a reference to a specific embodiment, it is not to be limited to the features thereof since many variations and modifications will readily occur to one skilled in the art. Such modifications and changes are therefore to be considered emcompassed in the following claims.

I claim:
1. Weighing scale comprising
load receiving means;
force measuring means for furnishing an indication of the magnitude of force applied thereto, said force measuring means having a force receiving member, the force applied to said force measuring means being limited to a maximum allowable force;

damping means for suppressing oscillations of said load receiving means, said damping means comprising a hydraulic damper;

means for intercoupling said damping means between said load receiving means and said force receiving member; and overload protection means coupled in series with said damping means in the path of force transmission between said load receiving means and said force receiving member.

2. A weighing scale as set forth in claim 1, wherein said overload protection means comprises a preloaded spring.

3. A weighing scale as set forth in claim 2, wherein said load receiving means comprises an elongated load receiving member moving in a substantially vertical direction in response to application of said load;

wherein said force receiving member is an elongated member adapted for movement in a substantially vertical direction and having a projection extending in a horizontal direction;

wherein said damping means comprises container means mounted on said projection, and hydraulic fluid, a piston and part of a piston rod in said container means, said piston rod extending in a vertical direction outside of said container means and having a piston rod collar on said outside extension; and wherein said means for intercoupling said load receiving means and said force receiving member comprises a bearing bracket having a top and bottom extension for guiding said piston rod, said bottom extension having a top surface abutting the bottom surface of said piston rod collar; and wherein said preloaded spring is a coil spring bearing against said top extension and said piston rod collar.

4. A weighing scale as set forth in claim 2 wherein said preloaded spring is preloaded to a force between 5 and 15% of the nominal load of said weighing scale.

* * * * *